United States Patent [19]
Uomori et al.

[11] Patent Number: 5,742,331
[45] Date of Patent: Apr. 21, 1998

[54] THREE-DIMENSIONAL IMAGE DISPLAY APPARATUS

[75] Inventors: Kenya Uomori, Hirakata; Atsushi Morimura, Nara, both of Japan

[73] Assignee: Matsushita Electric Industrial Co., Ltd., Osaka, Japan

[21] Appl. No.: 528,715

[22] Filed: Sep. 15, 1995

[30] Foreign Application Priority Data

Sep. 19, 1994 [JP] Japan .................................. 6-223360
Sep. 19, 1994 [JP] Japan .................................. 6-223361

[51] Int. Cl.$^6$ .................................................. H04N 13/00
[52] U.S. Cl. .......................... 348/51; 348/36; 348/39; 345/158; 345/156
[58] Field of Search .................. 348/51, 42, 580–583, 348/36–39; 345/156, 31, 32, 139, 126, 158; 342/176–186; 359/9, 13; 353/7; H04N 13/00

[56] References Cited

U.S. PATENT DOCUMENTS

| | | | |
|---|---|---|---|
| 3,097,261 | 7/1963 | Shipper et al. | 345/156 |
| 3,154,636 | 10/1964 | Schwertz | 345/156 |
| 3,406,312 | 10/1968 | Redman | 345/156 |
| 3,636,551 | 1/1972 | Maguire | 340/324 |
| 4,160,973 | 7/1979 | Berlin, Jr. | 340/718 |
| 4,238,840 | 12/1980 | Swainson | 365/119 |
| 4,639,081 | 1/1987 | O'Brien | 345/31 |
| 4,692,878 | 9/1987 | Ciongoli | 364/518 |
| 4,743,748 | 5/1988 | O'Brien | 250/201 |
| 4,870,600 | 9/1989 | Hiraoka | 364/522 |
| 4,952,024 | 8/1990 | Gale | 350/143 |
| 4,974,946 | 12/1990 | Solomon | 350/399 |
| 4,983,031 | 1/1991 | Solomon | 353/10 |
| 5,068,645 | 11/1991 | Drumm | 340/710 |
| 5,148,310 | 9/1992 | Batchko | 359/479 |
| 5,172,266 | 12/1992 | Garcia et al. | 359/478 |
| 5,250,888 | 10/1993 | Yu | 318/640 |
| 5,287,089 | 2/1994 | Parsons | 345/156 |
| 5,291,297 | 3/1994 | Steinmeyer | 348/44 |

(List continued on next page.)

FOREIGN PATENT DOCUMENTS

| | | | |
|---|---|---|---|
| 0 607 000 A2 | 7/1994 | European Pat. Off. | H04N 13/04 |
| 0 607 000 A3 | 7/1994 | European Pat. Off. | G06F 15/72 |
| 3-53695 | 3/1991 | Japan | H04N 13/04 |

OTHER PUBLICATIONS

"VR Maker, Virtual Reality Systems", *Japenese Nissho Electronics Co., Ltd.*, Crystal Eye VR System by U.S. Stereographics Co., Ltd., (pp.1, 2 and 6).

"A Shape Modeling System with a Volume Scanning Display and Multisensory Input Device", Kameyama et al, MIT, vol. 2, No. 2, Spring 1993, pp. 104–111.

*Primary Examiner*—Howard W. Britton
*Assistant Examiner*—Vu Le
*Attorney, Agent, or Firm*—Ratner & Prestia

[57] ABSTRACT

The orientation of an image display device is maintained fixed relative to the viewer, the image display device is enclosed in a transparent body, and by detecting rotation angles of the image display device with respect to the transparent body, an image that is to be viewed when the transparent body is held in a hand or the like is displayed on the image display device, thereby enabling the viewer to view a displayed object from any desired direction as if he is holding the object in his hand. The three-dimensional image display apparatus has an image display device whose display surface is held fixed relative to the viewer, a transparent body for accommodating the image display device therein, an encoder for detecting rotation angles of the image display device with respect to the transparent body, an orientation detector for calculating the difference between the orientation of the transparent body and the orientation of the image display device on the basis of the output of the encoder, and an image generator for generating an image for display on the image display device in accordance with the output of the orientation detector.

30 Claims, 16 Drawing Sheets

U.S. PATENT DOCUMENTS

| | | | |
|---|---|---|---|
| 5,349,379 | 9/1994 | Eichenlaub | 348/59 |
| 5,353,042 | 10/1994 | Klapman et al. | 345/156 |
| 5,388,990 | 2/1995 | Beckman | 434/38 |
| 5,394,202 | 2/1995 | Deering | 353/7 |
| 5,414,803 | 5/1995 | Malzbender | 395/127 |
| 5,450,094 | 9/1995 | Li et al. | 345/31 |
| 5,477,237 | 12/1995 | Parks | 345/156 |
| 5,490,784 | 2/1996 | Carmein | 434/55 |
| 5,495,576 | 2/1996 | Ritchey | 395/125 |
| 5,497,096 | 3/1996 | Banting | 324/555 |
| 5,526,022 | 6/1996 | Donahue et al. | 345/156 |
| 5,561,756 | 10/1996 | Miller et al. | 395/155 |
| 5,565,891 | 10/1996 | Armstrong | 345/156 |
| 5,585,813 | 12/1996 | Howard | 345/8 |
| 5,588,097 | 12/1996 | Ono et al. | 395/137 |

PRINCIPLE OF PERSPECTIVE TRANSFORMATION
PERSPECTIVE PROJECTION

SCREEN COORDINATES (X,Y)

HOW TO OBTAIN PERSPECTIVE PROJECTION POINT P'

PRIOR ART

TRANSPARENT CAPSULE

THREE-DIMENSIONAL IMAGE DISPLAY APPARATUS

BACKGROUND OF THE INVENTION

1. Field of the Invention

The present invention relates to a three-dimensional image display apparatus capable of displaying a three-dimensional image as viewed from an arbitrary direction.

2. Related Art of the Invention

FIG. 15 shows an example of a prior art three-dimensional image display apparatus.

In this apparatus, ultrasonic sound waves from three speakers 710 are detected by three microphones 740 attached to goggles 730 which are mounted with liquid-crystal shutters for stereoscopic image viewing. The liquid-crystal shutters are driven by a liquid-crystal shutter driver 720. From the detected sound waves, the three-dimensional position and the rotation components of the goggles 730 are computed, based on which a viewpoint calculator 750 calculates the position and the rotation components (viewer's viewpoint information) of the viewer's head.

Next, an image generator 770 alters the three-dimensional image displayed on a CRT 760 in accordance with the viewer's viewpoint measured. At this time, the display device is held in a fixed position, and while tracking the head (the glasses) of the viewer, the displayed content (viewpoint) of the image is transformed with the movement of the head so that the viewer can view the image as if the displayed object were really there (Reference: Crystal Eye VR System by Stereographics, U.S.A.).

However, in such a three-dimensional image display apparatus of the prior art, since the display device is held in a fixed position, an image cannot be presented as viewed from an arbitrary direction (for example, from a side).

Also, when viewing the image from an oblique direction, since the display surface is fixed the viewer is forced to view the image from a position substantially displaced to the right or left with respect to the screen, which causes the viewpoint-transformed image to be deformed due to the angle that the head makes with the display surface. This greatly reduces the sense of realism that makes the object appear to really exist there, and also reduces the effective field of view.

Furthermore, when the effective field of view the display apparatus can provide is considered, by only detecting the position of the viewer's head it is physically impossible to present the reverse side of the displayed object for viewing.

Moreover, to enable the viewer to observe a displayed object as if by holding it in his hands, for example, the movements of the viewer's hands, etc. have to be detected and the image has to be altered to match the movements. In practice, this processing is very complicated and it takes time to present the final image, resulting in unnaturalness of viewing.

SUMMARY OF THE INVENTION

The present invention is intended to overcome the above-enumerated problems, and it is a primary object of the invention to provide a three-dimensional display apparatus capable of presenting images for viewing from all angles, whereby a viewer can view a displayed image from any desired direction even when he is holding in his hands the image display device encased in a transparent capsule, and by rotating or moving the capsule, he can view the image of the displayed object from any desired direction so that he can observe the object as if by holding it in his hands.

The present invention overcomes the above-enumerated problems and displays an image as if a real object were really there. To accomplish this object, the invention achieves the following two objects simultaneously at high levels. One is to realize a construction that allows a stereoscopic image to be viewed from any direction and that prevents a viewpoint-transformed image from being deformed due to the angle that the viewer's head makes with the display surface.

Another is to realize a construction wherein the external shape of the display apparatus itself is not viewable. With these two features, a stereoscopically presented image can be displayed with its stereoscopic presentation range free from limitations imposed by the external shape of the image apparatus, that is, a stereoscopic image with a wide stereoscopic presentation range can be viewed from all directions without the viewer being made conscious that the display apparatus is actually there; even when the viewing position is moved, the viewpoint-transformed image does not appear deformed due to the angle that the viewer's head makes with the display surface, and a display is produced so that the displayed object appears to be a real object existing there. These objectives are accomplished by the present invention.

A three-dimensional image display apparatus of the present invention comprises:

an image display device for displaying an image;

a transparent body enclosing the image display device;

a support for supporting the image display device in movable fashion relative to the transparent body;

an orientation controller for performing control so that the image display device maintains a prescribed orientation;

positional change detecting means for detecting a change in position or a change in orientation from a prescribed initial position of the transparent body; and an image display altering means for altering an image displayed on the image display device in accordance with the result of the detection.

For example, a gyro or the like is used as the orientation controller to maintain the orientation of the image display device constant, and the positional change detecting means includes an encoder for detecting rotation angles of the image display device with respect to the transparent body and an orientation detector for calculating the difference between the orientation of the transparent body and the orientation of the image display device; an image generator as the image display altering means generates an image for display in accordance with the output of the orientation detector, and the generated image is displayed on the image display device. In this way, the displayed object can be observed from any desired direction as if the displayed object is being held in hands.

Further, according to the present invention, a stereoscopic image can be viewed from any direction, and since the angle that the viewer's head makes with the display surface is maintained constant, image deformation associated with the movement of the viewing position does not occur.

Furthermore, by constructing the display apparatus itself so that its external shape is not readily seen, the stereoscopic presentation range of the stereoscopically displayed image is not limited by the external shape of the display apparatus itself.

By achieving the above two features simultaneously, a stereoscopic image that has a wide stereoscopic presentation range and that looks natural when viewed from any direction can be presented for viewing. This achieves the production

[EXPLANATION OF CODES]

Figure 1:
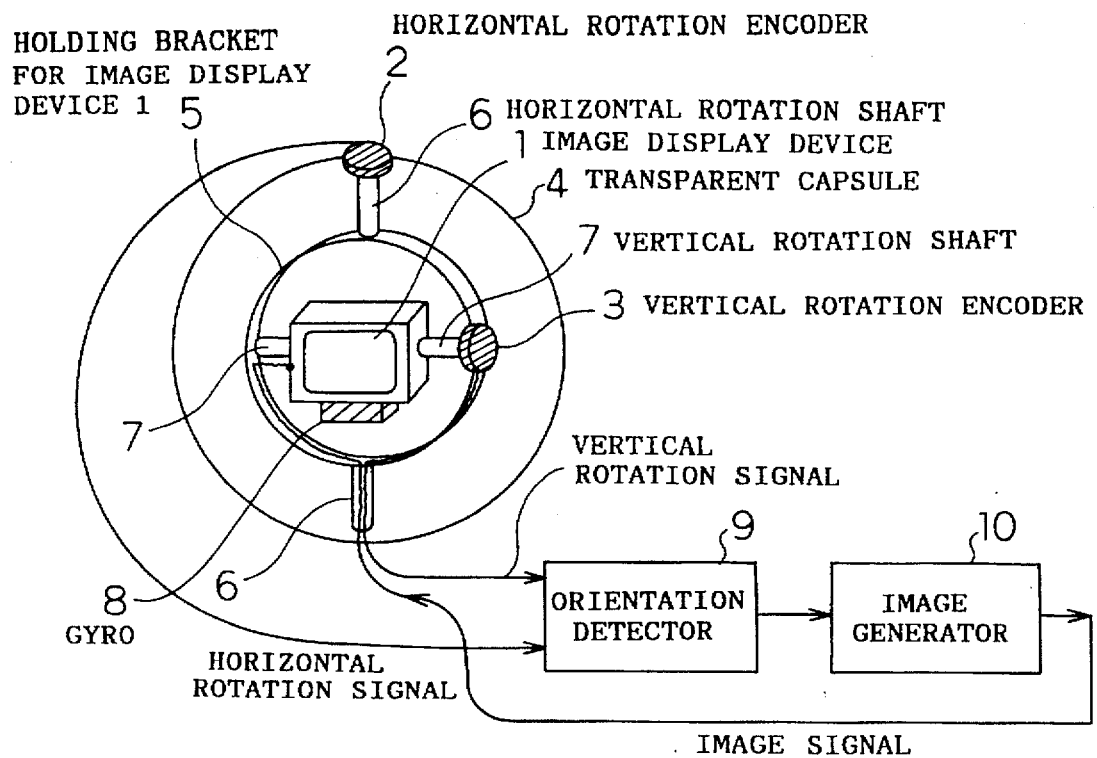
FIG. 1A is a diagram showing the construction of a three-dimensional image display apparatus according to a first embodiment of the present invention.
FIG. 1B is a diagram illustrating an alternative image display direction control technique according to the first embodiment of the present invention.
Figure 1:
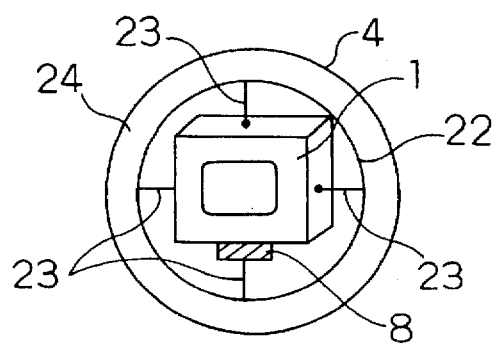

FIG. 1
1. IMAGE DISPLAY DEVICE, 2. HORIZONTAL ROTATION ENCODER, 3. VERTICAL ROTATION ENCODER, 4. TRANSPARENT CAPSULE, 5. HOLDING BRACKET FOR IMAGE DISPLAY DEVICE 1, 6. HORIZONTAL ROTATION SHAFT, 7. VERTICAL ROTATION SHAFT, 8. GYRO, 9. ORIENTATION DETECTOR, 10. IMAGE GENERATOR,

FIG. 2
11. CONCAVE MIRROR, 12. MIRROR IMAGE

Figure 3:
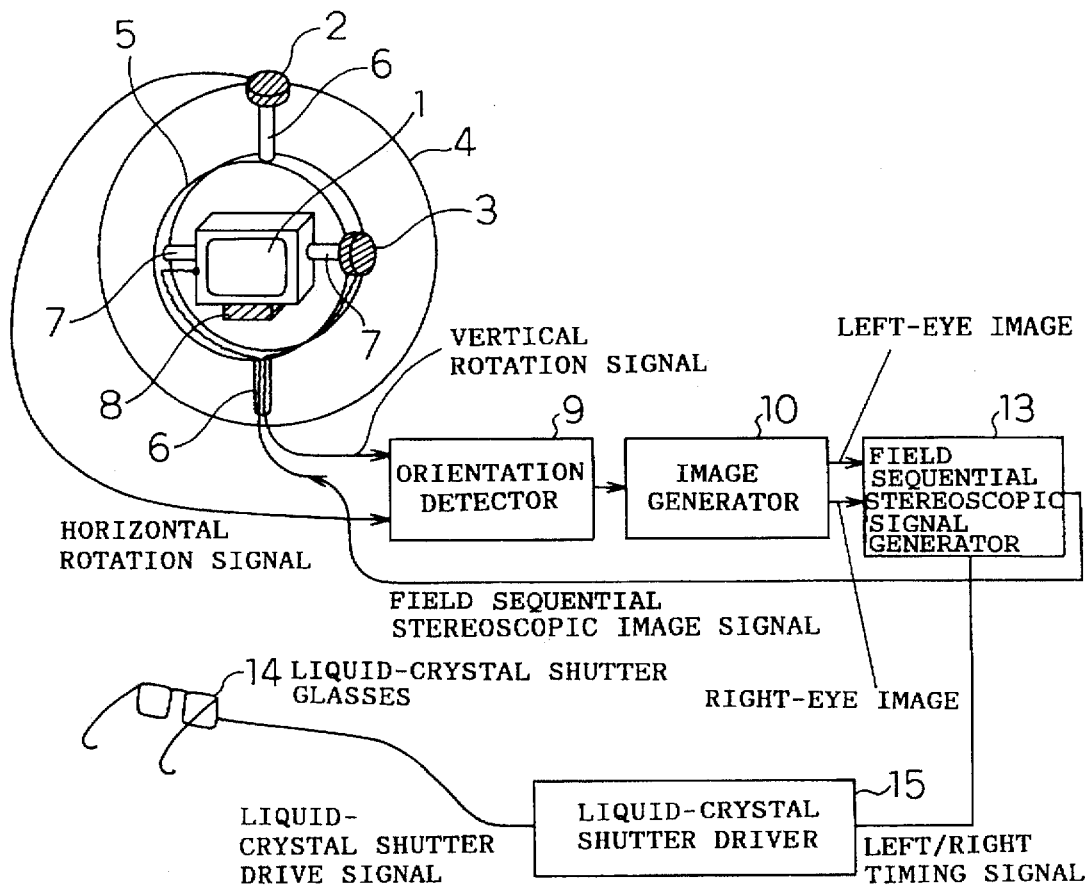
FIG. 3A is a diagram showing the construction of a three-dimensional image display apparatus according to a third embodiment of the present invention.
FIG. 3B is a timing diagram for field sequential stereoscopic image signals.
Figure 3:
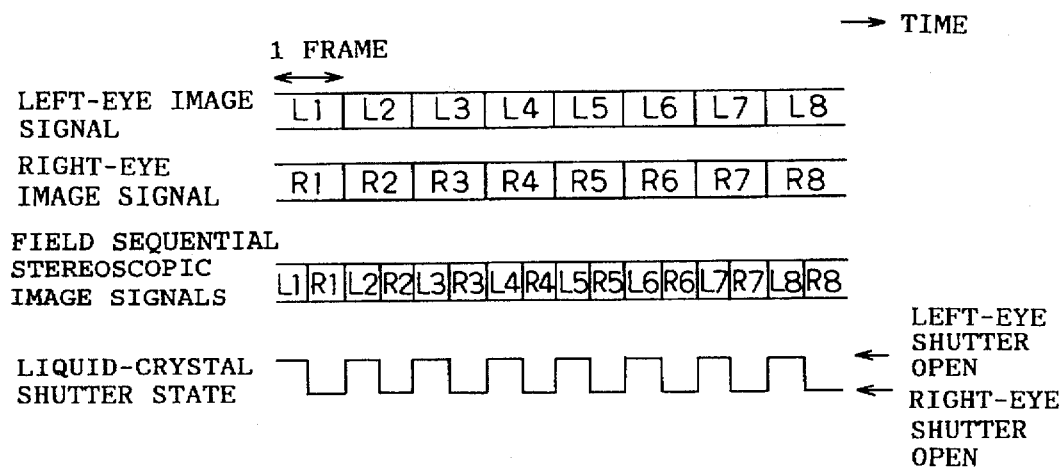
Figure 4:
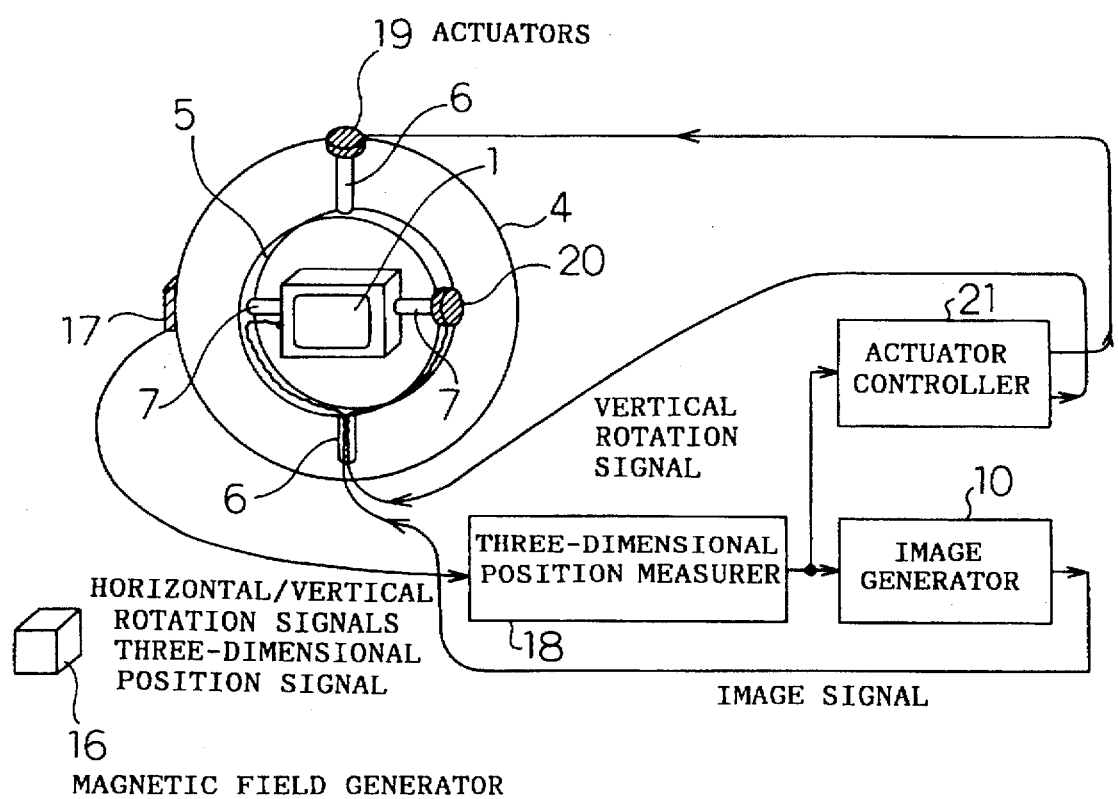
FIG. 4 is a diagram showing the construction of a three-dimensional image display apparatus according to a fourth embodiment of the present invention.
Figure 7:
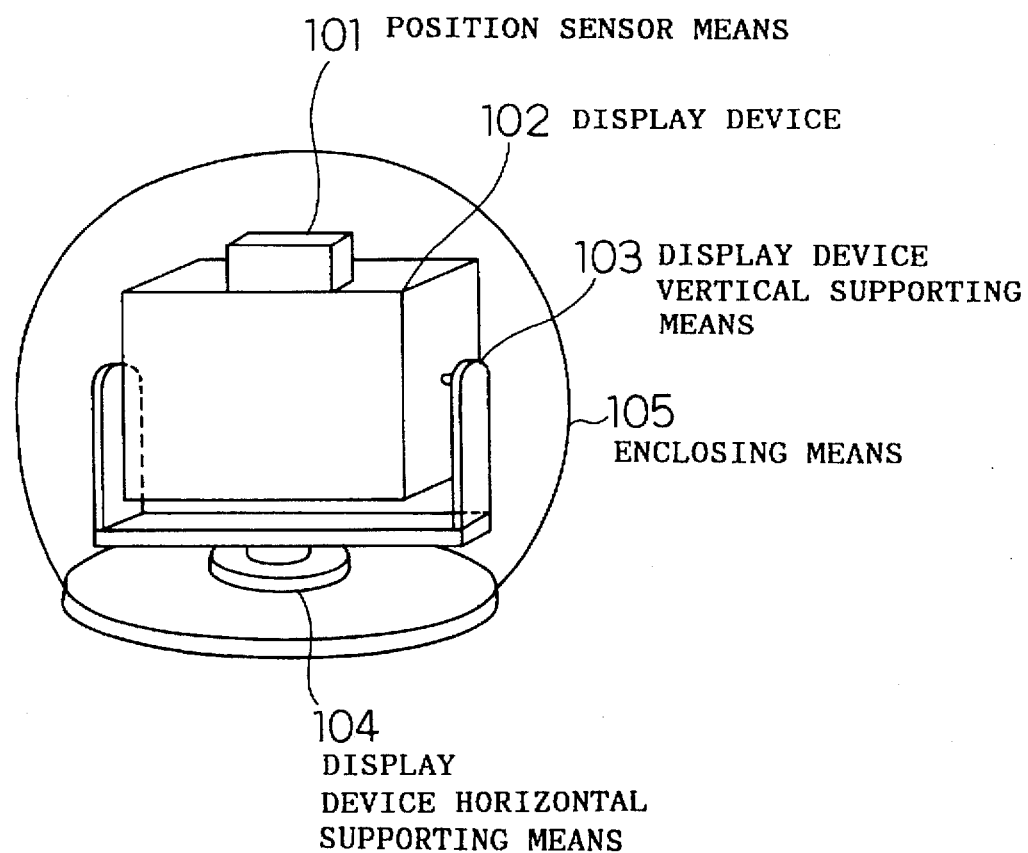
FIG. 7 a diagram showing the construction of a stereoscopic image display apparatus according to a sixth embodiment of the present invention.
Figure 13:
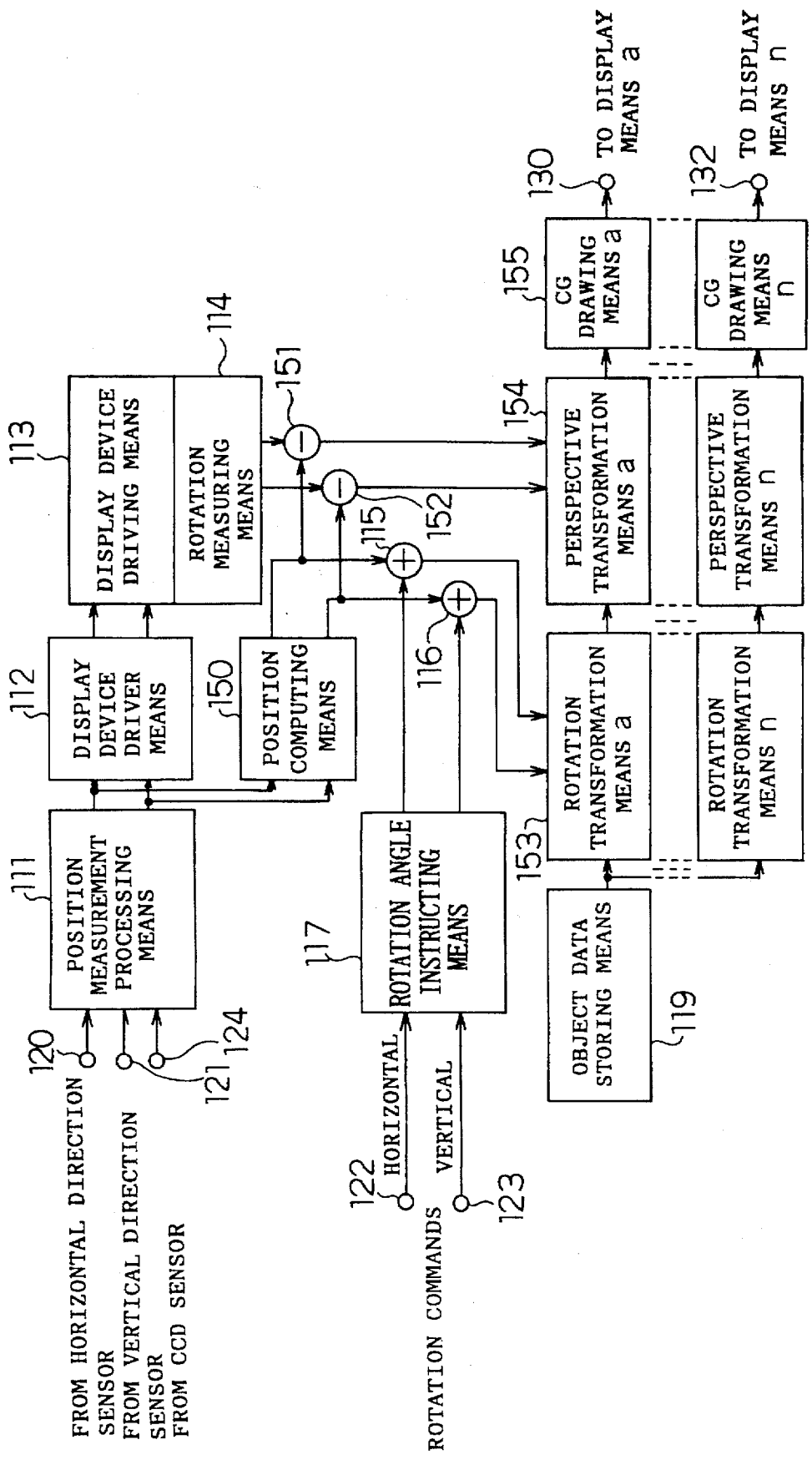
FIG. 13 is a block diagram showing the configuration of a signal processing system in a stereoscopic image display apparatus according to a seventh embodiment of the present invention.
Figure 16:
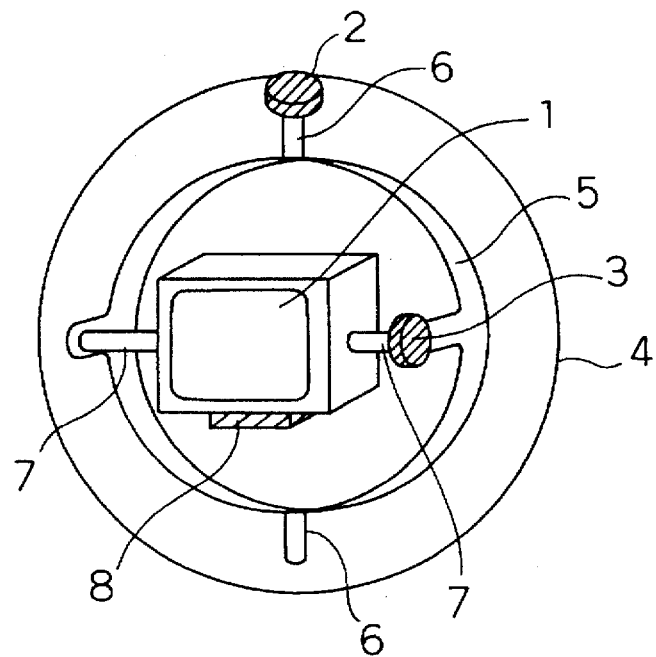
FIG. 16A is a perspective view showing the construction of a three-dimensional image display apparatus according to the present invention.
FIG. 16B is a perspective view showing the three-dimensional image display where the transparent capsule is rotated by 90 angle degree forward as shown by arrow from the state of the FIG. 16A.
Figure 16:
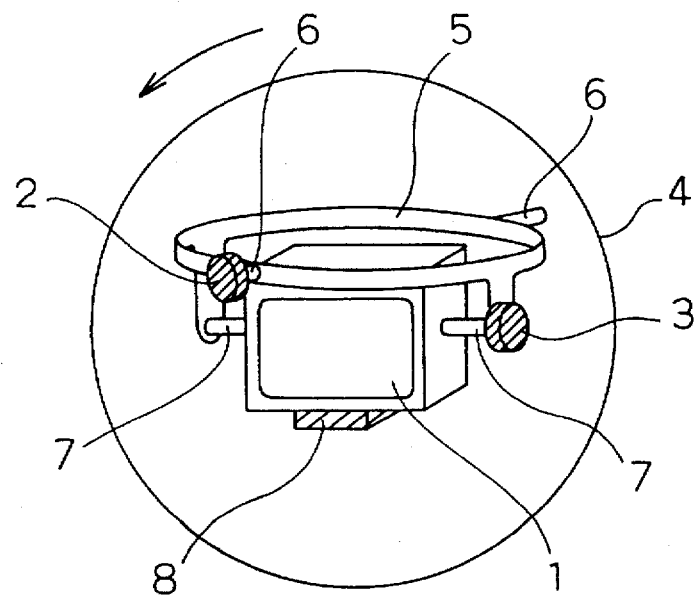

FIG. 3
13. FIELD SEQUENTIAL STEREOSCOPIC SIGNAL GENERATOR, 14. LIQUID-CRYSTAL SHUTTER GLASSES,

FIG. 4
16. MAGNETIC FIELD GENERATOR, 18. THREE-DIMENSIONAL POSITION MEASURER, 20. ACTUATORS, 21. ACTUATOR CONTROLLER,

FIG. 5
16. MAGNETIC FIELD GENERATOR, 17. MAGNETIC DETECTOR,

FIG. 7
101. POSITION SENSOR MEANS, 102. DISPLAY DEVICE, 103. DISPLAY DEVICE VERTICAL SUPPORTING MEANS, 104. DISPLAY DEVICE HORIZONTAL SUPPORTING MEANS, 105. ENCLOSING MEANS

Figure 8:
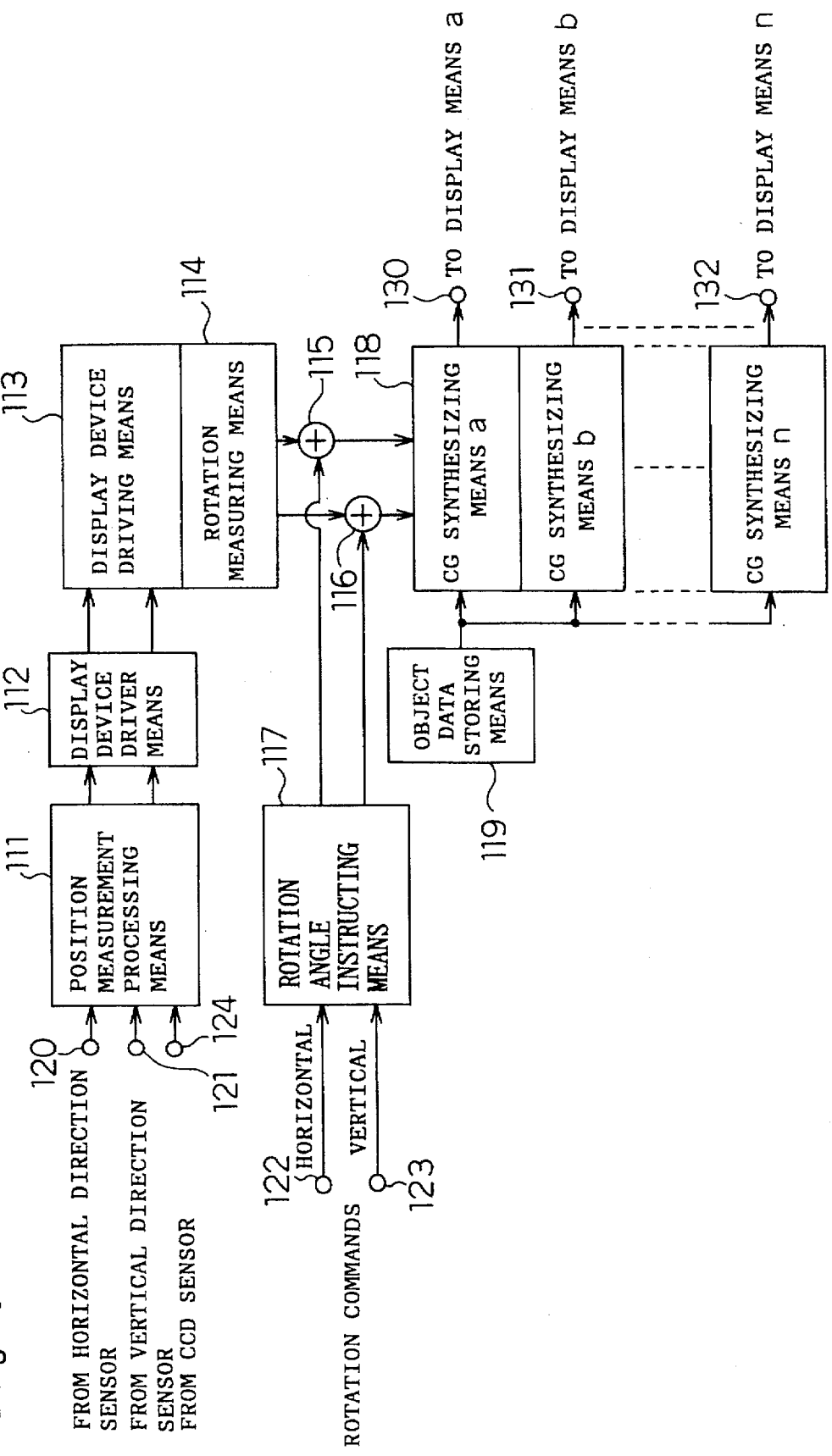
FIG. 8 is a block diagram showing the configuration of a signal processing system in the stereoscopic image display apparatus according to the sixth embodiment.

FIG. 8
111. POSITION MEASUREMENT PROCESSING MEANS, 112. DISPLAY DEVICE DRIVER MEANS, 113. DISPLAY DEVICE DRIVING MEANS, 114. ROTATION MEASURING MEANS, 118. CG SYNTHESIZING MEANS, 119. OBJECT DATA STORING MEANS, 130. TO DISPLAY MEANS

Figure 11:
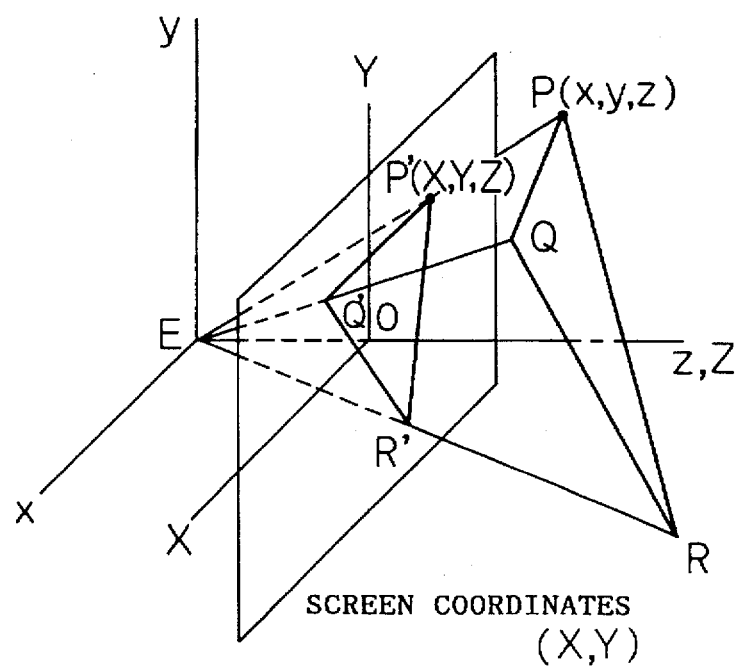
FIGS. 11A and 11B is a diagram illustrating a perspective transformation used in the sixth embodiment.
Figure 11:
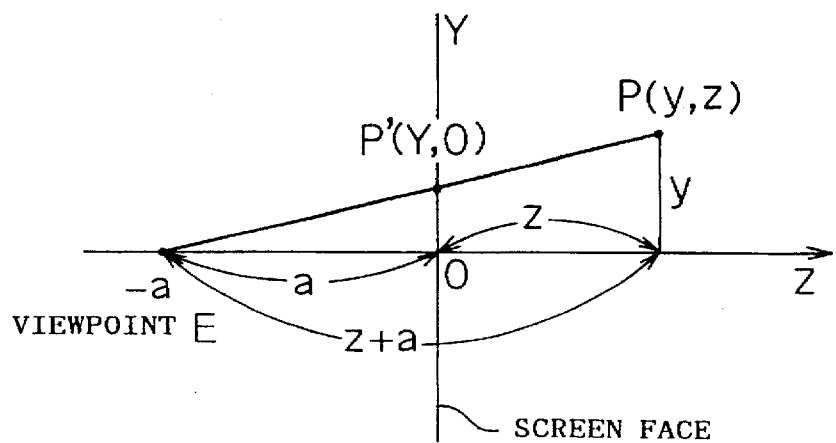

FIG. 11
1. PRINCIPLE OF PERSPECTIVE TRANSFORMATION, 2. PERSPECTIVE PROJECTION, 3. SCREEN COORDINATES, 4. HOW TO OBTAIN PERSPECTIVE PROJECTION POINT, 5. VIEWPOINT, 6. SCREEN FACE

FIG. 13
150. POSITION COMPUTING MEANS, 153. ROTATION TRANSFORMATION MEANS, 154. PERSPECTIVE TRANSFORMATION MEANS, 155. CG DRAWING MEANS

FIG. 15
770. IMAGE GENERATOR, 720. LIQUID-CRYSTAL SHUTTER DRIVER.

PREFERRED EMBODIMENTS

FIG. 1A is a diagram showing the construction of a three-dimensional image display apparatus according to a first embodiment of the invention. In FIG. 1A, reference numeral 1 is an image display device, 2 is a horizontal rotation encoder, 3 is a vertical rotation encoder, 4 is a transparent capsule forming a transparent body, 5 is a holding bracket for holding the display device 1 fixed in position, 6 is a horizontal rotation shaft, 7 is a vertical rotation shaft, 8 is a gyro as an orientation controller, 9 is an orientation detector, and 10 is an image generator as an image display altering means. The horizontal rotation encoder 2, the vertical rotation encoder 3, and the orientation detector 9 constitute a positional change detecting means.

while the holding bracket 5, the horizontal rotation shaft 6, and the vertical rotation shaft 7 constitute a support.

The operation of this embodiment will be described below. The image display device 1 is supported by the holding bracket 5 and the horizontal and vertical rotation shafts 6 and 7. With these two rotation shafts, the image display device 1 is supported in the transparent capsule 4, just like the gyroscope is supported on its axis. The construction is such that the orientation of the image display device 1 is not affected by the rotation of the transparent capsule 4. Furthermore, since the gyro 8 is attached to the image display device 1, the display screen always faces the same direction ( as long as there occurs no change in the viewer's viewing direction with respect to the image display device 1 the direction of the viewer's viewpoint) irrespective of the rotation angle of the transparent capsule 4.

The viewer holds the transparent capsule 4 in his hands and observes the image displayed on the image display device 1. At this time, when the transparent capsule 4 is rotated by hand, the image display device 1 keeps facing in the same direction (in the direction of the viewer's viewpoint) by the action of the gyro 8, and the horizontal and vertical rotation angles of the image display device 1 with respect to the transparent capsule 4 are detected by the horizontal and vertical rotation encoders 2 and 3. Using the horizontal and vertical rotation angles thus detected, the image generator 10 rotates the CG image of the displayed object to produce a display so that the viewer can observe the object displayed on the image display device 1 as if he is rotating the object by hand.

Rotation of an object in a CG image can be accomplished by the rotation of the object coordinate system or by shifting the viewpoint, but since these are known techniques, explanation will not be given here.

In the above-described first embodiment, the orientation of the image display device 1 is maintained constant by means of the gyro 8, but as far as the rotation in vertical directions is concerned, the gyro may be replaced by a weight, and gyroscopic action against the rotation in vertical directions may be accomplished by using the weight.

Furthermore, the gyro mechanism may be implemented using an acceleration detector so that the orientation of the image display device 1 can be maintained constant using the acceleration detector. The gyro 8 may also be replaced by a magnet, in which case a second magnet attracting the first magnet is installed outside so that the display surface of the image display device 1 always faces the same direction.

A further alternative construction is shown in FIG. 1B, in which the image display device 1 with the gyro 8 attached to it is mounted in a transparent spherical body 22 with support hardware 23, and this spherical body 22 is placed inside the transparent capsule 4 with a transparent liquid 24 (water or oil) filling the space between the transparent capsule 4 and the transparent spherical body 22. This construction also can keep the orientation of the image display device 1 constant irrespective of the rotation of the transparent capsule 4.

Figure 2:
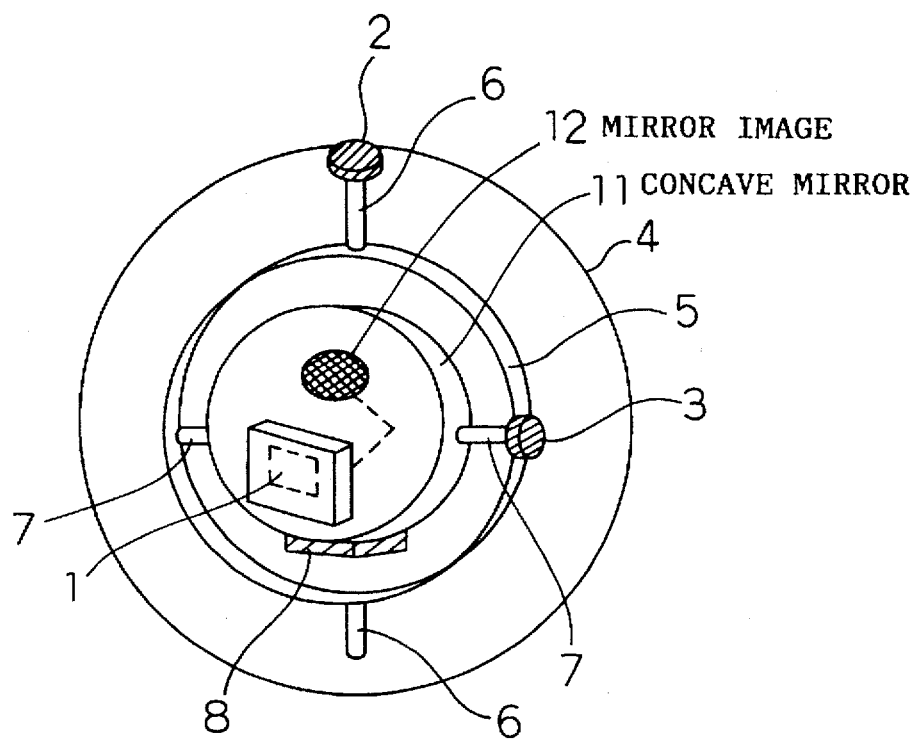
FIG. 2A is a diagram showing the construction of an image display section of a three-dimensional image display apparatus according to a second embodiment of the present invention.
FIG. 2B is a diagram for explaining how a mirror image is presented by a concave mirror for viewing.
Figure 2:
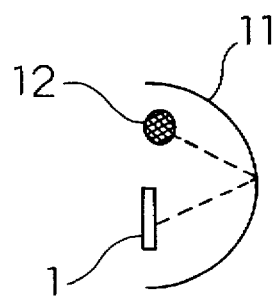

FIG. 2A shows the construction of an image display section of a three-dimensional image display apparatus according to a second embodiment. The construction of the other components (the orientation detector 9 and the image generator 10) is the same as that described in the first embodiment.

In FIG. 2A, reference numeral 1 is an image display device, 2 is a horizontal rotation encoder, 3 is a vertical rotation encoder, 4 is a transparent capsule, 5 is a holding bracket for holding the image display device 1 fixed in position, 6 is a horizontal rotation shaft, 7 is a vertical rotation shaft, and 8 is a gyro. These constituent elements are the same as those used in the first embodiment.

The differences of the second embodiment from the first embodiment are that the image display device 1 is mounted with its display surface facing the opposite direction from the viewer, i.e., facing a concave mirror 11, so that a mirror image 12 reflected from the concave mirror 11 is presented for viewing, and that the gyro 8 is attached to the concave mirror 11 so that the image display device 1 and the concave mirror 11 are together held in the same orientation.

Though not shown here, the same orientation detector 9 and image generator 10 as used in the first embodiment are used to detect the angles of the image display device 1 with respect to the transparent capsule 4 and generate image signals based on the detected angles.

The operation of the second embodiment will be described below. The operation itself is substantially the same as that of the first embodiment. That is, the concave mirror 11 with the image display device 1 mounted thereon is supported by the holding bracket 5 and the horizontal and vertical rotation shafts 6 and 7 and is encased in the transparent capsule 4.

The construction is such that the orientation of the concave mirror 11 is not affected by the rotation of the transparent capsule 4.

Since the gyro 8 is attached to the concave mirror 11, the display screen always faces the same direction (the direction of the viewer's viewpoint) irrespective of the rotation of the transparent capsule 4.

The viewer holds the transparent capsule 4 in his hands and observes the image displayed on the image display device 1.

At this time, when the transparent capsule 4 is rotated by hand, the concave mirror 11 keeps facing the same direction (the direction of the viewer's viewpoint) by the action of the gyro 8, and the horizontal and vertical rotation angles of the image display device 1 with respect to the transparent capsule 4 are detected by the horizontal and vertical rotation encoders 2 and 3. Using the results of the detection, the image generator 10 rotates the CG image of the displayed object to produce a display so that the viewer can observe the object displayed on the image display device 1 as if he is rotating the object by hand.

What the viewer actually views is the mirror image of the screen of the image display device 1 reflected by the concave mirror 11. FIG. 2B illustrates how this is done.

A cross-sectional view of the concave mirror 11 is shown. The image displayed on the image display device 1 is reflected by the concave mirror 11 to form the mirror image 12. What the viewer views is not the displayed image itself but the mirror image 12 of the displayed image. Therefore, an image which is reversed right, left, upward and downward is produced for display on the image display device 1.

Generally, it is known that an optical image formed by a mirror image produces a stereoscopic effect that enhances the sense of presence. This effect, coupled with the effect of producing a display so that the viewer can observe the displayed object as if he is holding it in his hands when he is holding the transparent capsule 4 in his hands, achieves the production of a three-dimensional image with enhanced realism.

FIG. 3A is a diagram showing the construction of a three-dimensional image display apparatus according to a third embodiment of the invention.

In FIG. 3A, reference numeral 1 is an image display device, 2 is a horizontal rotation encoder, 3 is a vertical rotation encoder, 4 is a transparent capsule, 5 is a holding bracket for holding the image display device 1 fixed in position, 6 is a horizontal rotation shaft, 7 is a vertical rotation shaft, 8 is a gyro, 9 is an orientation detector, and 10 is an image generator. These constituent elements are the same as those used in the first embodiment.

The difference of the third embodiment from the first embodiment is that the image generator 10 generates separate images for the right eye and the left eye and these images are then time multiplexed by a field sequential stereoscopic signal generator 13 for conversion into field sequential stereoscopic image signals; the thus converted images are displayed on the image display device 1, and the viewer views the images through liquid-crystal shutter glasses 14 which are driven by a liquid-crystal shutter driver 15 so that the right-eye and left-eye liquid-crystal shutters are alternately turned on to transmit light therethrough in synchronism with the image signals.

The operation of this embodiment will be described below. The operation is fundamentally the same as that of the first embodiment, except that the images displayed on the image display device 1 are binocular stereoscopic images.

The image display device 1 is supported by the holding bracket 5 and the horizontal and vertical rotation shafts 6 and 7, and is encased in the transparent capsule 4. The construction is such that the orientation of the image display device 1 is not affected by the rotation of the transparent capsule 4.

Since the gyro 8 is attached to the image display device 1, the display screen always faces the same direction (the direction of the viewer's viewpoint) irrespective of the rotation angle of the transparent capsule 4.

The viewer holds the transparent capsule 4 in his hands and observes the image displayed on the image display device 1.

At this time, if the transparent capsule 4 is rotated by hand, the image display device 1 keeps facing the same direction (the direction of the viewer's viewpoint) by the action of the gyro 8, and the horizontal and vertical rotation angles of the image display device 1 with respect to the transparent capsule 4 are detected by the horizontal and vertical rotation encoders 2 and 3.

In proportion to the horizontal and vertical rotation angles thus detected, the image generator 10 rotates the CG image of the displayed object to produce a display so that the viewer can observe the object displayed on the image display device 1 as if he is rotating the object by hand.

In this embodiment, the image generator 10 generates two CG images, one for the left eye and the other for the right eye, and these images are converted by the field sequential stereoscopic signal generator 13 into field sequential stereoscopic image signals. These signals are sent to the image display device 1 for display of the respective images which are viewed by the viewer through the liquid-crystal shutter glasses 14. In this way, the left-eye and right-eye images are respectively presented to the left eye and right eye independently of each other.

FIG. 3B shows signal timing for achieving the alternate presentation of the left-eye and right-eye images. The left-eye and right-eye signals are alternately multiplexed by the field sequential stereoscopic signal generator 13 in the order of left, right, left, right, and so on.

These images are displayed on the image display device 1, and in synchronism with the presentation of each image, the liquid crystals in the liquid-crystal shutter glasses 14 are driven by the liquid-crystal shutter driver 15 so that the left-eye liquid-crystal shutter is opened when the left-eye image is displayed, and the right-eye liquid-crystal shutter when the right-eye image is displayed.

This presents ordinary binocular stereoscopic images for viewing. The stereoscopic effect thus obtained adds to the sense of realism obtained by enabling the viewer to view the displayed object from the desired angle by rotating the transparent capsule 4 held in his hands. This achieves the production of a stereoscopic image with enhanced realism.

FIG. 4 is a diagram showing the construction of a three-dimensional image display apparatus according to a fourth embodiment of the invention.

In FIG. 4, reference numeral 1 is an image display device, 4 is a transparent capsule, 5 is a holding bracket for holding the image display device 1 fixed in position, 6 is a horizontal rotation shaft, 7 is a vertical rotation shaft, and 10 is an image generator. These constituent elements are the same as those used in the first embodiment.

The differences of the fourth embodiment from the first embodiment are that the gyro 8 is omitted and, instead of detecting the rotation angles by using the horizontal and vertical rotation encoders 2 and 3, the rotation angles and three-dimensional position of the transparent capsule 4 are measured by using a magnetic field generator 16, a magnetic detector 17, and a three-dimensional position measurer 18, and that based on the measurements thus made, an actuator controller 21 drives horizontal and vertical direction actuators 19 and 20 to control the orientation of the image display device 1 so that its display surface always faces the direction of the viewer's viewpoint.

The operation of this embodiment will be described below. The image display device 1 is supported by the holding bracket 5 and the horizontal and vertical rotation shaft 6 and 7.

With these two rotation shafts, the image display device 1 is supported in the transparent capsule 4, just like the gyroscope is supported on its axis. The construction is such that the orientation of the image display device 1 in the transparent capsule 4 can be arbitrarily determined by the horizontal and vertical direction rotation actuators 19 and 20.

The viewer holds the transparent capsule 4 in his hands and observes the image displayed on the image display device 1.

At this time, the three-dimensional position and rotation components of the transparent capsule 4 are detected by the magnetic detector 17 and the three-dimensional position measurer 18.

Figure 5:
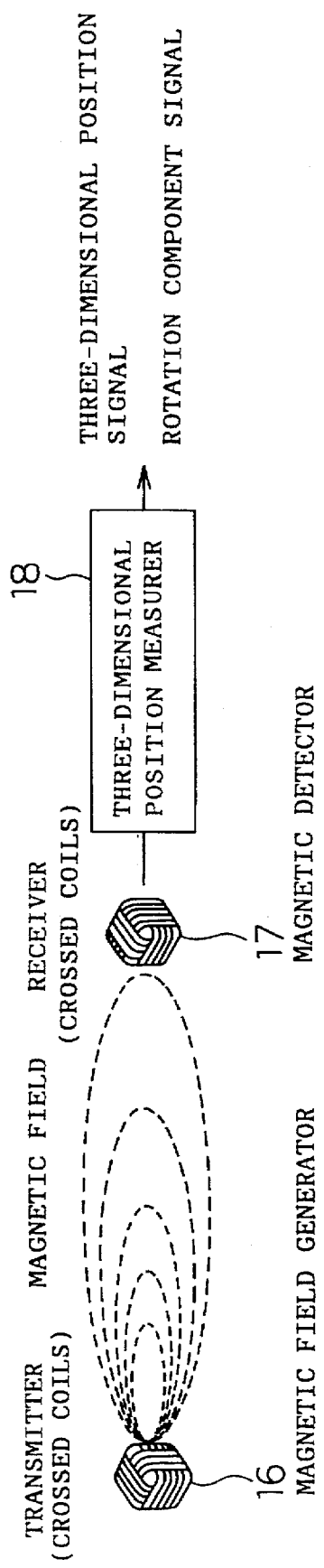
FIG. 5 is a diagram illustrating the operating principle of a three-dimensional position measuring device.

The method of detection may be implemented using known techniques such as used in the three-dimensional position measuring apparatus of Polhemus, U.S.A. More specifically, as shown in FIG. 5, an alternating current is applied to the magnetic field generator 16 which generates three mutually perpendicular magnetic fields, and the magnetic detector 17 with crossed coils detects the currents induced in its coils. The three-dimensional position measurer 18 then calculates the three-dimensional position (x, y, and z components) and rotation components (pitch, yaw, and roll components) of the magnetic detector 17.

Based on the thus detected three-dimensional position and rotation components of the transparent capsule 4, the actuator controller 21 issues drive instructions to the horizontal and vertical direction actuators 19 and 20 so that the display surface of the image display device 1 faces the direction of the predetermined three-dimensional position of the viewer's viewpoint.

Thus, the viewer can always view the image displayed on the image display device 1 from the front even if the three-dimensional space is moved or rotated by holding the transparent capsule 4 in his hands.

Further, in generating CG images, the image generator 10 changes the viewpoint for the coordinates of the CG image, on the basis of the three-dimensional position and rotation components of the transparent capsule 4, to produce a display so that the viewer can view the object displayed on the image display device 1 as if he is moving or rotating the object by hand.

As described above, according to this embodiment, by detecting the three-dimensional position and rotation components of the transparent capsule 4 not only the rotation components of the transparent capsule 4 but also the translation components thereof can be reflected in the change of the image displayed on the image display device 1, thus achieving the production of a very realistic image for viewing.

The three-dimensional image display apparatus of this embodiment may also be provided with a viewer position detecting means (which can be implemented using infrared sensors described later) for detecting the position of the viewer; in this case, the actuators 19 and 20 are driven, based on the results of the viewer's position detection, so that the image display device 1 always faces the direction of the viewer. Further, the displayed image may be altered according to the position of the viewer.

Figure 6:
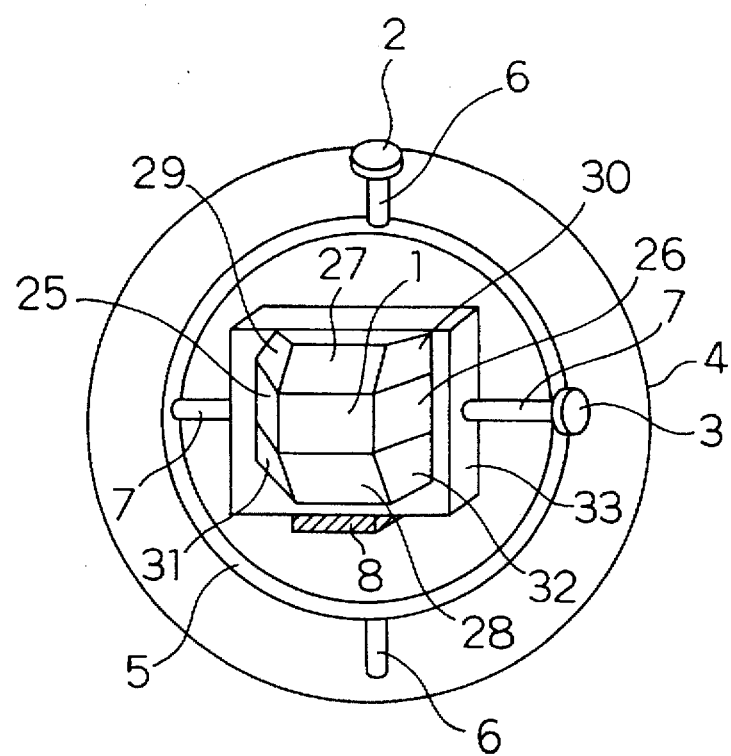
FIG. 6 is a diagram showing the construction of an image display section of a three-dimensional image display apparatus according to a fifth embodiment of the present invention.

FIG. 6 is a diagram showing the construction of an image display section of a three-dimensional image display apparatus according to a fifth embodiment of the invention. The construction of the other sections (the orientation detector 9 and the image generator 10) is the same as that of the corresponding sections of the first embodiment.

In FIG. 6, reference numeral 1 is an image display device, 2 is a horizontal rotation encoder, 3 is a vertical rotation encoder, 4 is a transparent capsule, 5 is a holding bracket for holding the image display device 1 fixed in position, 6 is a horizontal rotation shaft, 7 is a vertical rotation shaft, and 8 is a gyro. These constituent elements are the same as those used in the first embodiment.

The difference of the fifth embodiment from the first embodiment is that a total of 9 image display devices are provided, which are, in addition to the image display device 1, an image display device 25, an image display device 26, an image display device 27, an image display device 28, an image display device 29, an image display device 30, an image display device 31, and an image display device 32; these display devices are held fixed together in a display device holder 33 which is supported by the vertical rotation shaft 7.

Though not shown here, the same orientation detector 9 and the image generator 10 as used in the first embodiment are used to detect the angles of the image display device 1 with respect to the transparent capsule 4 and generate image signals based on the detected angles.

The operation of the fifth embodiment will be described below. The operation itself is substantially the same as that of the first embodiment. That is, the image display device holder 33 with the nine image display devices, 1, 25, 26, 27, 28, 29, 30, 31, and 32, mounted therein, is supported by the holding bracket 5 and the horizontal and vertical rotation shafts 6 and 7, and is encased in the transparent capsule 4.

The construction is such that the orientation of the nine image display devices is not affected by the rotation of the transparent capsule 4.

Further, since the gyro 8 is attached to the image display device holder 33, the display screen always faces the same direction irrespective of the rotation of the transparent capsule 4.

The viewer holds the transparent capsule 4 in his hands and observes the image displayed on the image display device 1.

At this time, the nine image display devices, 1, 25, 26, 27, 28, 29, 30, 31, and 32, respectively display the images of an object as viewed from the respective image display directions.

When the transparent capsule 4 is rotated by hand or the like, the image display section keeps facing the same direction (the direction of the viewer's viewpoint) by the action of the gyro 8, and the horizontal and vertical rotation angles of the image display section with respect to the transparent capsule 4 are detected by the horizontal and vertical rotation encoders 2 and 3. Based on the detected rotation angles, the image generator 10 rotates the CG images of the displayed object and generates image signals for images as viewed from the nine directions for the respective image display devices; thus, images as viewed from the front, from the left, from the right, from above, from below, from the upper left, from the upper right, from the lower left, and from the lower right, are respectively displayed on the nine image display devices 1 (front), 25 (left), 26 (right), 27 (above), 28 (below), 29 (upper left), 30 (upper right), 31 (lower left), and 32 (lower right).

In this way, the viewer can observe images as viewed from various directions simultaneously.

Furthermore, if the image display section is constructed to display a single image using nine image display devices like a multi-screen image display apparatus, a wide-view image can be presented for viewing.

As described, according to this embodiment, images as viewed from various directions can be displayed simultaneously, thereby enabling the viewer to view multi-directional images at once; furthermore, an image larger than one image display device can be displayed, which enhances the reality of the image presented for viewing.

In the fifth embodiment, the number of image display devices used was set to 9, but this number may be changed according to the purpose.

In the first to fifth embodiments, if the transparent capsule 4 is constructed from a low-transmittance material so that the inside of the transparent capsule cannot be seen clearly, the inside of the transparent capsule, except the display screen of the image display device 1 where images are displayed by illumination, can be hidden from view of the viewer.

This gives the viewer a feeling as if only the displayed object exists inside the transparent capsule, and the reality is further increased.

In the first, second, third, and fifth embodiments, a hole may be opened through the transparent capsule so that the viewer can put his hand or the like through the hole and move the image display device 1 to set its initial orientation.

Furthermore, in the first, second, third, and fifth embodiments, a magnet may be attached to the image display holding bracket 5, the image display device 1, the concave mirror 11, or the transparent spherical body 22, so that the magnet-attached body can be guided by an external magnet to set the initial orientation of the image display device 1.

In the first to fifth embodiments, a circular bracket was used as the image display holding bracket 5 for holding the image display device 1, but the visibility of the displayed image can be further increased if the construction is modified so that the display screen of the image display device 1 will not be blocked from view.

For example, when the horizontal and vertical rotation shafts 6 and 7 are arranged in such manner that each axis of these shafts 6,7 are not crossing to each other as shown in FIG. 16A, that is, they have spatial lag, that is, the vertical rotation shaft 7 is positioned forward the horizontal rotation shaft 6, the area of the image display device 1 blocked from view by the holding bracket 5 can be reduced as shown in FIG. 16B.

FIG. 7 shows an external view of a three-dimensional image display apparatus according to a sixth embodiment of the invention. Reference numeral 101 is a position sensor means for measuring the position of the viewer, 102 is a display device for displaying a stereoscopic image, 103 is a display device vertical supporting means, 104 is a display device horizontal supporting means, and 105 is an enclosing means.

FIG. 8 is a block diagram of a signal processing system according to this embodiment. Reference numeral 111 is a position measurement processing means, 112 is a display device driver means for driving a display device driving means 113 for moving the display device 102, 113 is the display device driving means for moving the display device 102, 114 is a rotation measuring means for measuring the rotation of the display device 102, 115 and 116 are signal adding means, 117 is a rotation angle instructing means for converting rotation commands to rotation angles, 118 is a CG synthesizing means for rotating data of an object in proportion to the rotation angles and for calculating an image for projection on the display screen, and 119 is an object data storing means for storing data of the object.

The operation of each element of the above stereoscopic display apparatus will be described below. First, the position measurement processing means 111 performs the following processing on signals fed from the position sensor means 101.

Figure 9:
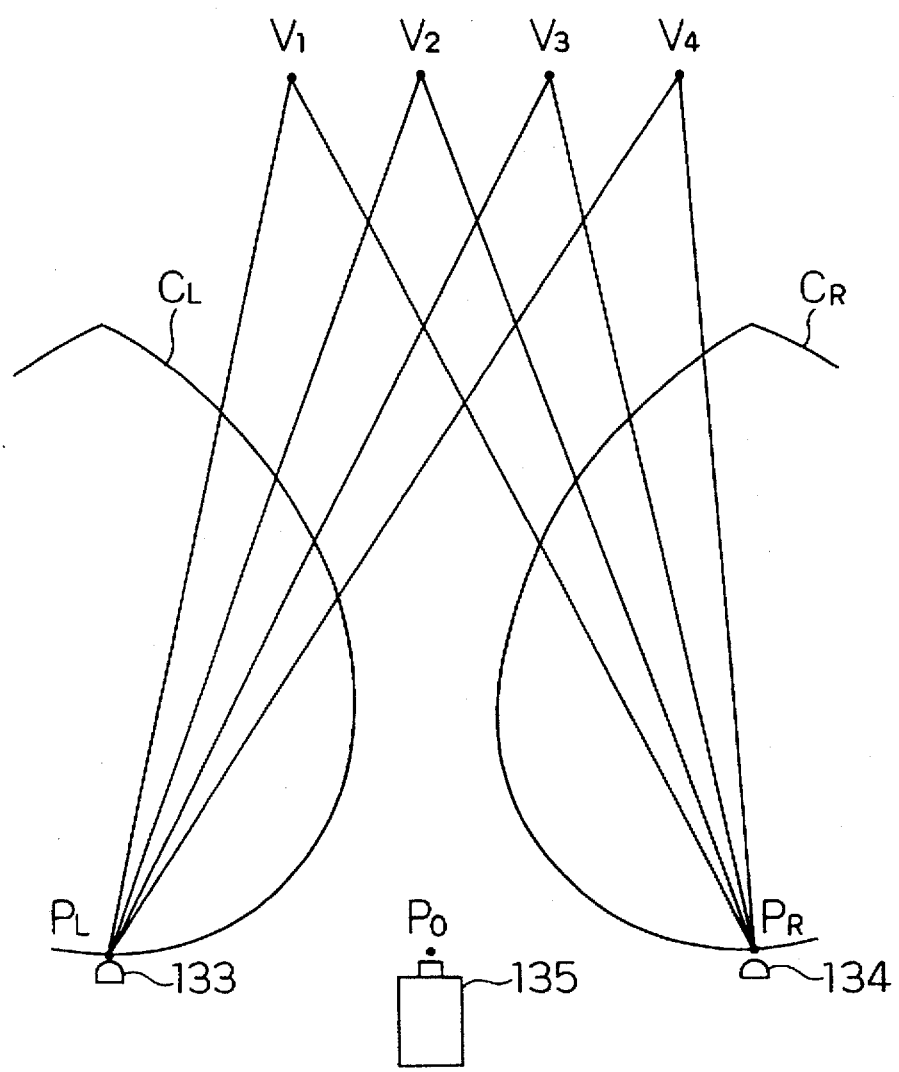
FIG. 9 is a characteristic diagram for position sensors used in the sixth embodiment.

FIG. 9 shows the sensor arrangement of the position sensor means 101 as viewed from the top.

In FIG. 9, reference numerals 133 and 134 are infrared sensors having preferred directionality, and 135 is an infrared CCD (camera) sensor. Signals from the infrared sensors 133 and 134 are coupled to a horizontal direction sensor input terminal 120 in FIG. 8.

When observing an image displayed on the display device 102, the viewer wears an infrared LED that emits infrared light which is received by the infrared sensors 133 and 134. The directionalities of the infrared sensors are indicated by CL and CR, respectively.

Figure 10:
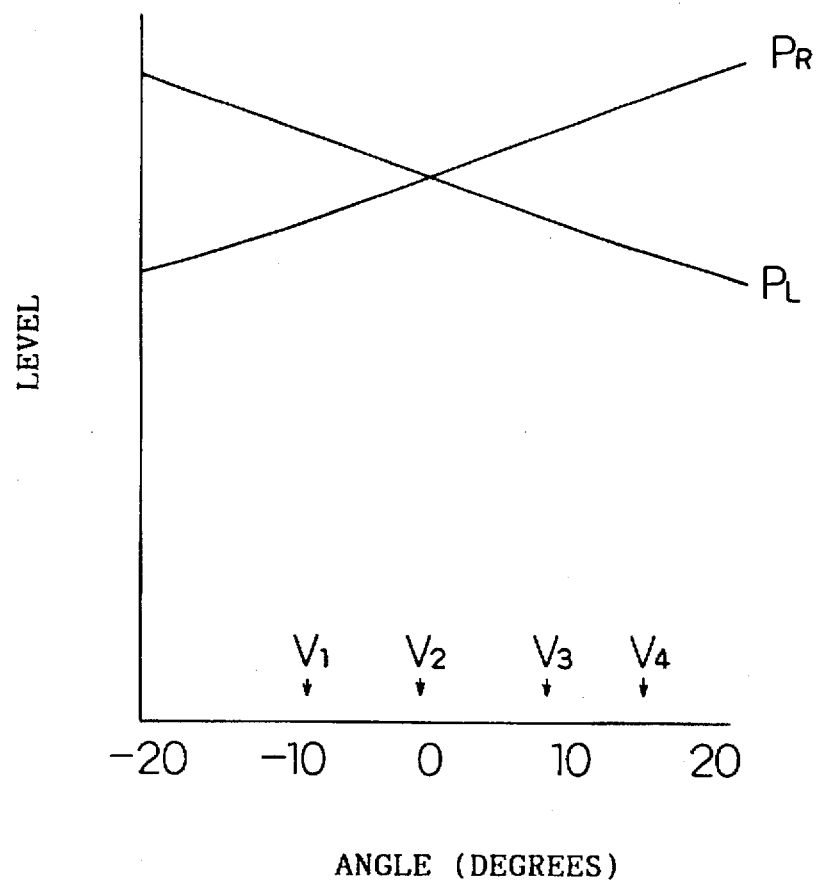
FIG. 10 is a signal level characteristic diagram for the position sensors used in the sixth embodiment.

FIG. 10 shows signal levels when infrared light rays radiated from positions indicated at V1 to V4 are received at positions PL and PR. The positional change is converted to a signal level by utilizing sensor directionality.

The position measurement processing means 111 measures the horizontal position by using the signal level difference. More specifically, when the signals from the sensors 133 and 134 are denoted by Epl and Epr respectively, if (Epl-Epr) is positive, it is determined that the viewer (wearing the LED) is positioned to the left, and if (Epl-Epr) is negative, it is determined that the viewer (wearing the LED) is positioned to the right.

Measurement of the vertical position can be accomplished by rotating the horizontal measurement setup in vertical directions.

The infrared CCD sensor 135 measures the location of the viewer (wearing the LED) positioned substantially in front of it on a pixel-by-pixel basis. The CCD sensor may be omitted if sufficiently accurate measurements can be made by using the infrared sensors 133 and 134 alone.

The processing results of the horizontal and vertical measurements continue to be output to the display device driver means 112 until the display device 102 comes to face the viewer correctly.

The display device driver means 112 amplifies positive or negative signals corresponding to the measured horizontal and vertical positions, and supplies motor driving power to the display device driving means 113. With the supplied power, the display device driving means 113 drives motor to rotate the display device vertical supporting means 103 and display device horizontal supporting means 104, thereby rotating and moving the display device 102 to the designated position.

The amounts of rotation are then converted by the rotation measuring means 114 to horizontal and vertical angles. Further, when image rotation commands from the viewer are input at 122 and 123, the rotation angle instructing means 117 converts them to corresponding rotation angles, which are then combined with the signals from the rotation measuring means 114 and fed to the CG synthesizing means 118.

Commands for image vertical/horizontal rotation are issued by the viewer rotating the enclosing means 105 directly or by using a man-machine interface such as a switch. Using the coordinates data of the object stored in the object data storing means 119, the CG synthesizing means 118 synthesizes an image for perspective projection onto the screen, on the basis of the predetermined viewpoint and object positions, the screen position, and the rotation angles of the object determined in the above manner.

This image synthesis is a well known technique in computer graphics (CG). This technique will be described briefly below. In FIG. 11A, in xyz coordinates the origin E is taken at the viewpoint.

The display screen is taken in a plane perpendicular to the z axis, and coordinates on the screen are denoted as X, Y, Z coordinates, the Z axis pointing in the same direction as the z axis. Denoting vertices of an object as P, Q, and R, and assuming P (x, y, z) lies in the YZ plane (yz plane), the projection of the point P onto the screen, i.e., the projected point P', can be expressed, from FIG. 11B, as

[Equation 1]

$$Y=y \cdot a/(z+a)$$

Likewise for the xz plane, it is expressed as

[Equation 2]

$$X=x \cdot a/(z+a)$$

The projections of the points Q and R are obtained similarly. Using rotation matrix Re, and when rotated about an axis passing through the origin and a point (l, m, n) by θ, the rotation of the object PQR is given as

[Equation 3]

$$[XYZH] = [xyz1]T$$

where H is an additional coordinate to equate the dimensions of the coordinate system, and T is a rotation transformation matrix which is expressed as $$\begin{bmatrix} 1 & 0 & 0 & 0 \\ 0 & 1 & 0 & 0 \\ 0 & 0 & 1 & 0 \\ -1 & -m & -n & 1 \end{bmatrix} [Re] \begin{bmatrix} 1 & 0 & 0 & 0 \\ 0 & 1 & 0 & 0 \\ 0 & 0 & 1 & 0 \\ 1 & m & n & 1 \end{bmatrix}$$

where Re is
[Equation 4]

$$\begin{bmatrix} nx^2 + (1-nx^2)\cos\theta & nxny(1-\cos\theta) + nz\sin\theta & nxnz(1-\cos\theta) - ny\sin\theta & 0 \\ nxny(1-\cos\theta) - nz\sin\theta & ny^2 + (1-ny^2)\cos\theta & nynz(1-\cos\theta) + nx\sin\theta & 0 \\ nxnz(1-\cos\theta) + ny\sin\theta & nynz(1-\cos\theta) - nx\sin\theta & nz^2 + (1-nz^2)\cos\theta & 0 \\ 0 & 0 & 0 & 1 \end{bmatrix}$$

When the angle the axis of rotation makes with the x axis is denoted as $\alpha$, the angle with the y axis as $\beta$, and the angle with the z axis as $\gamma$, nx, ny, and nz are specified by $\cos\alpha$, $\cos\beta$, and $\cos\gamma$, respectively.

Using the above-described method, the CG synthesizing means 118 calculates any rotation of the object caused by a shift in the viewing position. Details of the calculation method are described in Masuda, "Three-Dimensional Display," SANGYO TOSHO, pp. 69–88, and further explanation of the method will not be given here.

In the CG synthesizing means 118 a to n, images are synthesized in advance by shifting the viewer's viewpoint in increments of a distance equal to the interpupillary distance or a fraction of it. The display device 102 is rotated and moved to follow the movement of the viewer's viewpoint, but a situation may occur where the physical rotation of the display device 102 cannot catch up with the movement of the viewer's viewpoint. Such a situation can be addressed by synthesizing images in advance.

This will be explained in more detail. If the above situation occurs, the viewer will perceive the difference of the stereoscopically displayed object from a real object as something unnatural, and will notice that he is seeing a stereoscopic image displayed there. When an image matching the shifted viewpoint is synthesized in advance and is already displayed at a position that matches the shifted viewpoint, unnaturalness arising from the difference between a real object and a stereoscopic display does not occur even when the viewpoint is moved quickly. This achieves the production of a very realistic stereoscopic display.

The multiple viewpoint images thus synthesized are output to the display device 102.

Figure 12:
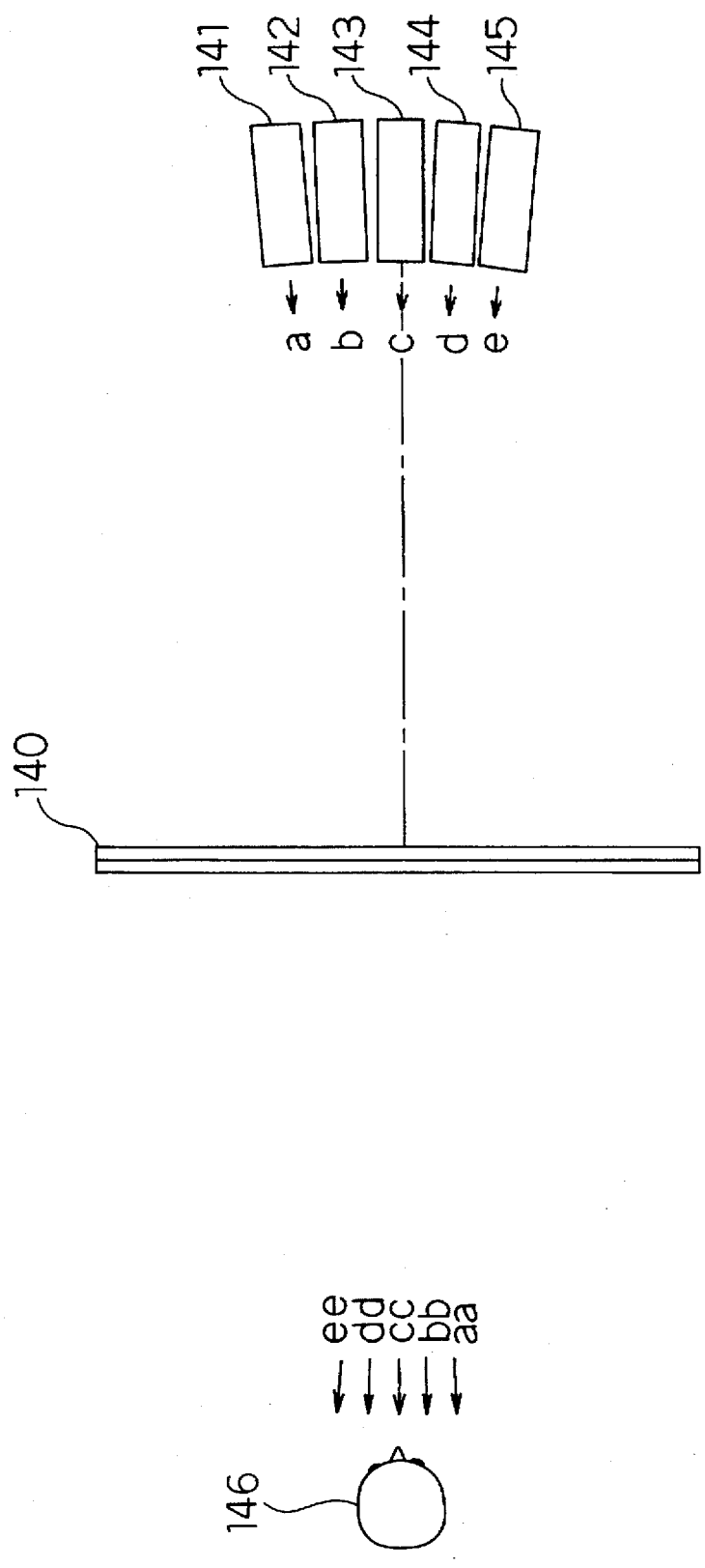
FIG. 12 is a diagram showing the construction of a stereoscopic image display means according to the sixth embodiment.

FIG. 12 shows the details of the display device 102. In FIG. 12, reference numeral 140 is a lenticular screen, 141 to 145 are image projecting means, and 146 is a viewer.

With the lenticular screen 140, an image projected from the image projecting means 141 toward the direction of a is focused at a point in the direction of aa and before the viewer 146. Likewise, an image projected from the image projecting means 145 toward the direction of e is focused at a point in the direction of ee.

In the case of FIG. 12, a combination of aa and cc, a combination of bb and dd, and a combination of cc and ee each form a stereo pair whose component images are presented to the respective eyes of the viewer who then combines the images to synthesize a stereoscopic image in his brain. If aa is combined with bb, bb with cc, ..., and dd with ee to form stereo pairs, the number of pairs increases and the range of stereoscopic perception is enlarged, but unnaturalness drops since image transitions become more noticeable.

If aa is combined with dd and bb with ee to form stereo pairs, image transitions become less noticeable, but instead, the number of stereo pairs decreases, reducing the range of stereoscopic perception. Ideally, image transitions should be made less noticeable, and the number of image projecting means should be increased to enlarge the range of stereoscopic perception.

With the display device 102 capable of presenting a wide stereoscopic perception range, even if there occurs a slight delay in following the viewpoint, unnaturalness arising from the stereoscopic display does not occur at all. This achieves the production of a stereoscopic display that appears as if a real object were there.

If the whole image display apparatus is constructed from a black light-absorbing body and the apparatus cover is made from an ND-based glass (plastic) that partially absorbs light, the display apparatus itself cannot be readily seen. With this construction, solid structures (such as panel frames surrounding the display device) actually existing around the displayed image are hidden from view, as a result of which the stereoscopically displayed image is free from the influence of these structures that tend to limit the space surround the image. With such construction, the desired display can be produced as originally calculated in the CG synthesizing means 118.

With the above construction, even when the viewer moves and the viewing position changes, not only the stereoscopic effect due to binocular parallax but a natural sense of depth due to motion parallax can be obtained (when the viewer's face moves, the positional relationship of the object changes; this change of the positional relationship of the object is important to obtain a natural sense of depth). Furthermore, even when the viewing position changes, the angle that the viewer's head makes with the display surface is maintained constant so that no image deformation occurs.

This achieves a very natural stereoscopic display which has not been possible with any prior art display apparatus.

Next, a seventh embodiment of the invention will be described. The configuration of the seventh embodiment is shown in FIG. 13, wherein the same constituent parts as those in the configuration of the sixth embodiment shown in FIG. 8 are designated by like reference numerals and explanation of such parts will not be repeated here. The difference from FIG. 8 is the addition of a position computing means 150 for computing the viewer' position, subtracting means 151 and 152 for subtracting the data of the position computing means 150 from the data of the rotation measuring means 114, rotation transformation means 153, perspective transformation means 154, and CG drawing means 155. The external shape of the display apparatus of this embodiment is the same as that shown in FIG. 7.

The objective of the seventh embodiment is to achieve a technique that can accommodate quick movements of the viewer, and thereby present a stereoscopic image with a high degree of realism close to a real object. To achieve this objective, the viewer's position is computed using signals from the position measurement processing means 111, independently of the rotation measuring means 114. By obtaining the viewer's position independently of the rotation of the display device 102, a display is achieved that is not affected by a delay in the rotation of the display device 102.

First, the position computing means 150 obtains the viewer's position in terms of angles from the difference between PR and PL levels (shown in FIG. 10) which are the output levels of the respective direction sensors. At the same time, the centroid of the viewer's face is obtained using a CCD sensor (preferably, an infrared CCD sensor). When good accuracy cannot be obtained near angle 0 by the direction sensors, positions measured with the accuracy of one pixel by the CCD sensor are converted to angles and used for the measurement. The adding means 115 and 116 add the thus obtained angles to the rotation angles converted from the displayed image rotation commands given by the viewer.

Figure 14:
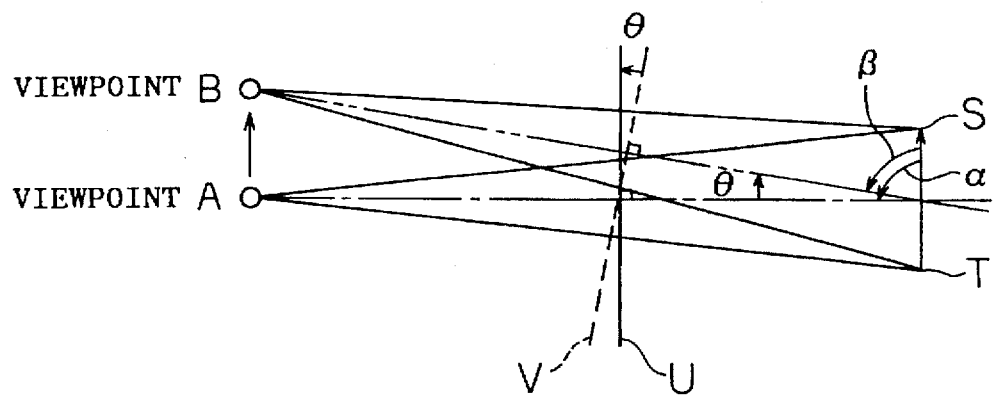
FIGS. 14A and 14B is a diagram for explaining the operation of the stereoscopic image display apparatus according to the seventh embodiment of the present invention.
Figure 14:
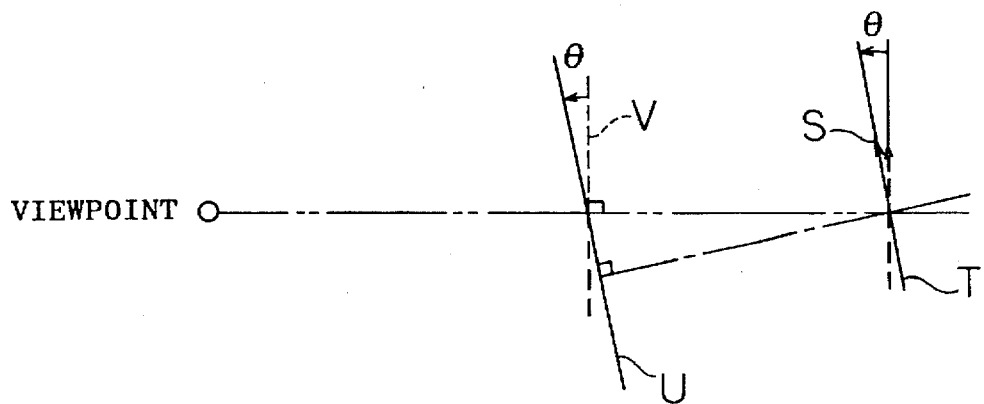
Figure 15:
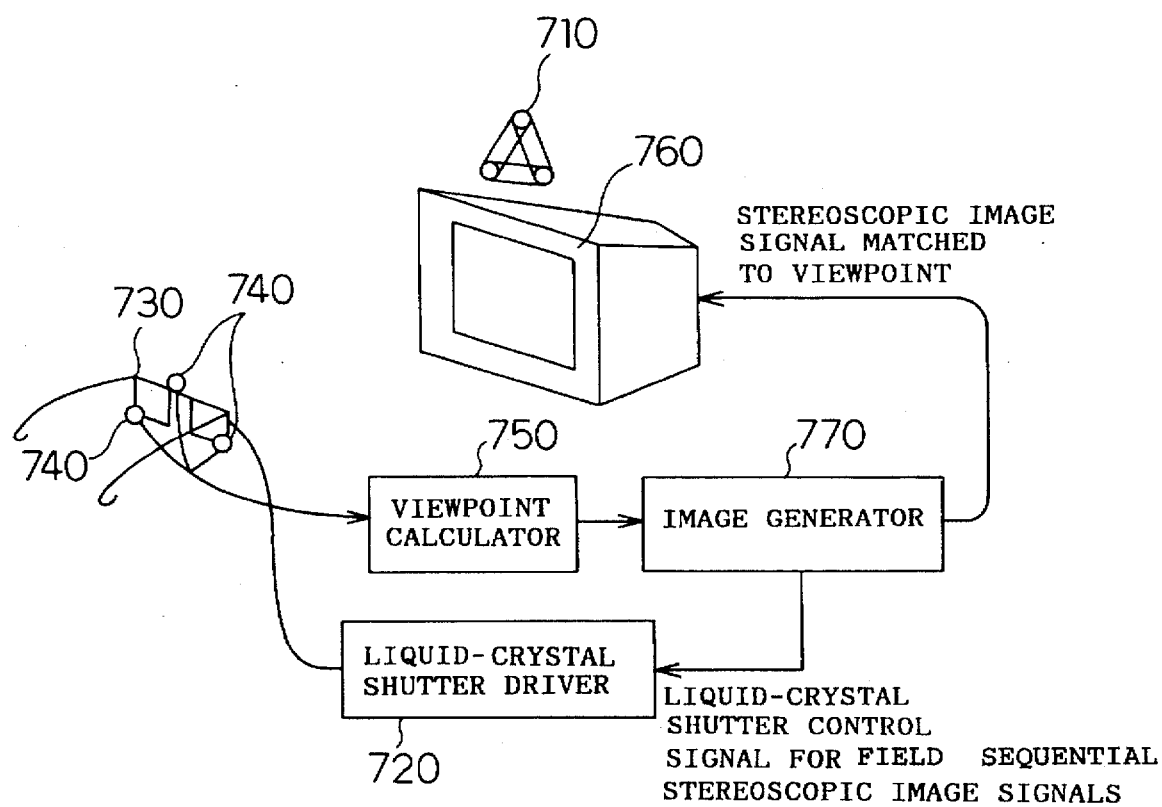
FIG. 15 is a diagram showing the construction of a three-dimensional image display apparatus according to the prior art.

Using the finally obtained angles, the rotation transformation means 153 applies rotation transformations to the object data. Two rotation transformation methods will be described with reference to FIGS. 14A and 14B. In FIG. 14A, ST designates an object.

Suppose that the current viewpoint A moved to viewpoint B. Then, the coordinates data of the object is rotated by $\alpha-\beta=\theta$ for conversion of the viewpoint angle relative to the object. Further, the difference between the position of the viewer and the position of the display device 102 (the angle determining the distance from the front face of the display device 102 to the viewer) is obtained by the subtracting means 151 and 152, and the angle $\theta$ is input to the perspective transformation means 154.

The perspective transformation means 154 rotates a virtual screen face (the face onto which the object is perspectively projected from the viewpoint) by $\theta$ from V to U, as shown in FIG. 14A; thus, when the actual position of the display device 102 is U, the screen face is transformed from the virtual screen face V free from rotation delay to the actual screen position U subjected to rotation delay, and an image to be displayed is synthesized in the CG drawing means 155.

To facilitate understanding, a diagram with a fixed viewpoint is shown in FIG. 14B. Dotted lines show the state before rotation and perspective transformations are applied, and solid lines show the state after the transformations.

In this manner, when the viewpoint is changed abruptly and the display face cannot catch up with the change, the position of the screen face for perspective transformation of such a momentary state is obtained as the difference between the data measured by the rotation measuring means 114 for the display device 102 and the data computed by the position computing means 150, and the virtual screen for perspective transformation is made to match this state. The transitional state is accommodated by compensating for the response delay of the display face in this way, so that the viewer will not be given an unnatural feeling. This arrangement makes it possible to transform the image without delay in responding to quick movements of the viewer.

This makes the stereoscopically displayed object appear as natural as if a real object were there.

As described, according to the seventh embodiment, the response is fast enough to follow quick movements of the viewer, unnaturalness associated with the movement of the viewpoint does not occur at all, and an image can be presented that appears as natural as if a real object were there. This offers enormous practical advantages.

Furthermore, if the enclosing means 105 encasing the display device 102 therein is rotated simultaneously with the displayed image in accordance with the rotation commands given by the viewer, it is possible to give the viewer a feeling that the displayed image and the enclosing means 105 are made as one.

Further, when giving display screen rotation commands by rotating the enclosing means 105, if the load required to rotate the enclosing means 105 is varied in accordance with the size of the rotation angle and the magnitude of the signal processing amount, this will aid in giving a feeling as if the object were really there.

In the image display apparatus of the sixth and seventh embodiments, five parallax images were displayed using the lenticular screen, but the number of parallax images used need not necessarily be restricted to 5.

Further, the type of the display device need not necessarily be limited to the lenticular type, but a moving image hologram using a light modulating device such as IP (integral photograph) or liquid crystal may be used in which images are reproduced by interference waves. In this case, the moving image hologram may have a narrow image viewing range, which greatly facilitates the implementation as a moving image hologram.

The apparatus described above used infrared light or a TV camera for tracking the movement of the viewer, but the tracking method is not limited to the illustrated ones. Other methods may be used as long as the speed and accuracy requirements can be satisfied.

Also, the apparatus have been described as having the ability to output images as viewed from any direction by using CG. Alternatively, images as viewed from designated directions may be synthesized and stored in advance, and necessary images may be retrieved from the storage. In this case, images photographed by a camera may be stored and retrieved as necessary.

As described above, according to the present invention, a displayed object can be viewed from any desired direction as if holding it by hand.

Further, wherever the viewer moves or whichever direction is designated for display, an image that matches the position or direction can be presented for viewing. When the viewer moves and the viewing position changes, not only the stereoscopic effect due to binocular parallax but a natural sense of depth due to motion can be obtained (when the viewer's face moves, the positional relationship of the object changes; this change of the positional relationship of the object is important to obtain a natural sense of depth).

Furthermore, even when the viewing position changes, the angle that the viewer's head makes with the display surface is maintained constant, the displayed image does not deform depending on the viewing position of the viewer, and a natural-looking object can be presented for viewing. Also, by obscuring the whole construction of the image display apparatus itself, a stereoscopic image of the intended construction can be presented for viewing without being influenced by the real structure (external shape of the display apparatus). The viewer can thus observe a very realistic stereoscopic image.

What is claimed is:

1. A three-dimensional image display apparatus comprising:

an image display device for displaying an image;

a transparent body enclosing said image display device;

a support for supporting said image display device in movable fashion relative to said transparent body;

an orientation controller for maintaining said image display device in a prescribed orientation;

positional change detecting means for detecting one of a change in position and a change in orientation of said transparent body from a prescribed initial position of said transparent body; and image display altering means for altering an image displayed on said image display device in accordance with the result of the detection.

2. A three-dimensional image display apparatus according to claim 1, wherein
said image display altering means alters said image displayed responsive to the change of the position or orientation of said transparent body as if the image content displayed were fixed to said transparent body.

3. A three-dimensional image display apparatus according to claim 1, wherein
said positional change detecting means includes an encoder for detecting the amount of rotation of said transparent body relative to said image display device, and an orientation detector for detecting the difference between the orientation of said transparent body and the orientation of said image display device on the basis of the amount of rotation detected by said encoder.

4. A three-dimensional image display apparatus according to claim 1, wherein
said orientation controller includes an actuator for maintaining said image display device in a prescribed orientation on the basis of the result of the detection fed from said positional change detecting means.

5. A three-dimensional image display apparatus comprising:
an image display device for displaying an image;
a transparent body enclosing said image display device;
a support for supporting said image display device in movable fashion relative to said transparent body;
an orientation controller for maintaining said image display device in a prescribed orientation;
positional change detecting means for detecting one of a change in position and a change in orientation of said transparent body from a prescribed initial position of said transparent body;
viewer position detecting means for detecting the position of a viewer; and
image display altering means for altering an image displayed on said image display device in accordance with the detected viewing position of the viewer and with the change of the position or orientation detected by said positional change detecting means.

6. A three-dimensional image display apparatus according to claim 5, further comprising
display direction controlling means for turning said image display device toward the direction of the viewer detected by said viewer position detecting means.

7. A three-dimensional image display apparatus comprising:
an image display device for displaying an image;
a transparent body enclosing said image display device, said transparent body constructed from a material of low light transmittance in order to obscure everything except the displayed image;
viewer position detecting means for detecting the position of a viewer;
image display altering means for altering said image displayed on said image display device so that said displayed image matches the detected viewing position of the viewer; and
display direction controlling means for turning said image display device toward the direction of the viewer detected by said viewer position detecting means by moving said image display device with at least horizontal and vertical rotation.

8. A three-dimensional image display apparatus according to claim 7, further comprising
a transparent movable cover for covering said image display device, and
cover direction changing means for turning said cover toward the direction of the viewer detected by said viewer position detecting means.

9. A three-dimensional image display apparatus according to claim 1,
said transparent body is constructed from a material of low light transmittance in order to obscure everything except the displayed image.

10. A three-dimensional image display apparatus according to claim 5,
said transparent body is constructed from a material of low light transmittance in order to obscure everything except the displayed image.

11. A three-dimensional image display apparatus according to claim 1, wherein
said image display device includes a concave mirror projecting a mirror image of a displayed image, formed on said concave mirror, the mirror image being presented for viewing.

12. A three-dimensional image display apparatus according to claim 5, wherein
said image display device includes a concave mirror projecting a mirror image of a displayed image, formed on said concave mirror, the mirror image being presented for viewing.

13. A three-dimensional image display apparatus according to claim 1, wherein
said orientation controller includes a gyro mechanism for maintaining said image display device in a prescribed orientation.

14. A three-dimensional image display apparatus according to claim 5, wherein
said orientation controller includes a gyro mechanism for maintaining said image display device in as prescribed orientation.

15. A three-dimensional image display apparatus according to claim 1, wherein
said image display device is enclosed by a transparent spherical body, and wherein said transparent body covers the transparent spherical body, and
the space between said transparent body and said transparent spherical body is liquid-filled.

16. A three-dimensional image display apparatus according to claim 5, wherein
said image display device is enclosed by a transparent spherical body, and wherein said transparent body covers the transparent spherical body, and
the space between said transparent body and said transparent spherical body is liquid-filled.

17. A three-dimensional image display apparatus according to claim 1, further comprising
display direction designating means for the viewer to designate the direction from which to view a displayed image, wherein said image display altering means generates an image for display as viewed from the direction designated by said display direction designating means.

18. A three-dimensional image display apparatus according to claim 5, further comprising display direction designating means for the viewer to designate the direction from which to view a displayed image, wherein said image display altering means generates an image for display as viewed from the direction designated by said display direction designating means.

19. A three-dimensional image display apparatus according to claim 7, further comprising display direction designating means for the viewer to designate the direction from which to view a displayed image, wherein said image display altering means generates an image for display as viewed from the direction designated by said display direction designating means.

20. A three-dimensional image display apparatus according to claim 1, wherein said image display device presents at least two images with different viewpoints independently to the left and right eyes.

21. A three-dimensional image display apparatus according to claim 5, wherein said image display device presents at least two images with different viewpoints independently to the left and right eyes.

22. A three-dimensional image display apparatus according to claim 7, wherein said image display device presents at least two images with different viewpoints independently to the left and right eyes.

23. A three-dimensional image display apparatus according to claim 1, wherein said image display device is movable with at least horizontal and vertical rotation.

24. A three-dimensional image display apparatus according to claim 7, further comprising:

rotation measuring means for measuring the position of said image display device; and perspective transformation means for altering said image displayed on said image display device responsive to the detected viewing position of the viewer and the measured position of said image display device.

25. A three-dimensional image display apparatus according to claim 1, wherein said transparent body is moveable in six degrees of freedom, whereby said transparent body moves with varying three-dimensional position and rotation components.

26. A three-dimensional image display apparatus according to claim 5, wherein said transparent body is moveable in six degrees of freedom, whereby said transparent body moves with varying three-dimensional position and rotation components.

27. A three-dimensional image display apparatus according to claim 7, wherein said transparent body is moveable in six degrees of freedom, whereby said transparent body moves with varying three-dimensional position and rotation components.

28. A three-dimensional image display apparatus according to claim 1, wherein said transparent body is moveable with at least one of varying three-dimensional position components and varying three-dimensional rotation components.

29. A three-dimensional image display apparatus according to claim 5, wherein said transparent body is moveable with at least one of varying three-dimensional position components and varying three-dimensional rotation components.

30. A three-dimensional image display apparatus according to claim 7, wherein said transparent body is moveable with at least one of varying three-dimensional position components and varying three-dimensional rotation components.

* * * * *